July 30, 1940.　　　　　F. E. RUNGE　　　　　2,209,664
RECORDING OF ELECTRICAL IMPULSES
Filed Dec. 22, 1937
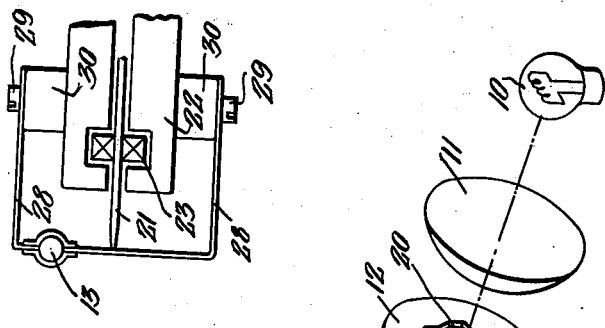
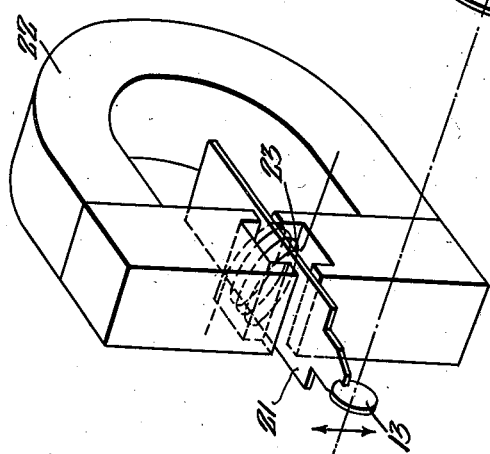
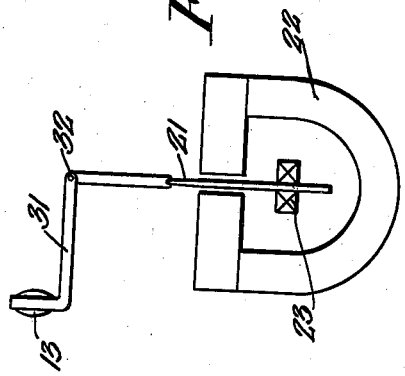
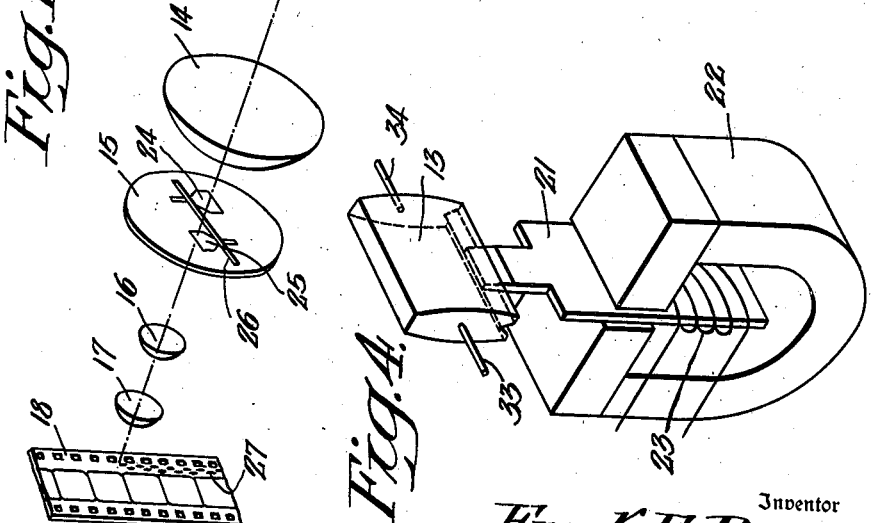
Inventor
Frank F. Runge
By
Attorney Patented July 30, 1940

2,209,664

UNITED STATES PATENT OFFICE 2,209,664

RECORDING OF ELECTRICAL IMPULSES

Frank E. Runge, Oaklyn, N. J., assignor to Radio Corporation of America, a corporation of Delaware Application December 22, 1937, Serial No. 181,156

6 Claims. (Cl. 179—100.3)

This invention relates to the recording of electrical impulses such as those of audio frequency, and has for its principal object the provision of an improved apparatus and method of operation which are inexpensive and simple as compared to those heretofore available.

A distinguishing characteristic of the invention is a linear optical system which avoids the need of a vibratible mirror or the like. To this end a small lens interposed in the path of the recording light beam is vibrated in response to the impulses to be recorded. While the invention is illustrated as applied to the recording of a push-pull type of record, it is apparent that it is readily adaptable to other types of record.

The invention will be better understood from the following description considered in connection with the accompanying drawing and its scope is indicated by the appended claims.

Referring to the drawing,

Figure 1 illustrates a recording system wherein the vibratible mirror is mounted at the end of a vibratible armature which is energized in accordance with the impulses to be recorded, Figure 2 illustrates a resilient type of support for the vibratible lens, Figure 3 illustrates a bell crank type of support for the vibratible lens, and Figure 4 shows the vibratible lens as provided with a pivotal mount and arranged to be slightly rotated in response to movement of its cooperating armature.

In the system of Fig. 1, light from an exciter lamp 10 is projected through a lens 11, the apertures of a plate 12, a vibratible lens 13, a lens 14, the light slit of a plate 15 and lenses 16 and 17 to a photographic record 18 such as a sound motion picture film. It will be noted that the apertures 19 and 20 each have the form of a triangle provided with an extended base to prevent the disturbance caused by overshooting of the beams and with slit-like extensions or tail at their peaks to ensure better definition of the record.

Vibration of the lens 13 in accordance with the impulses to be recorded is effected by means of an armature 21 which is mounted in a magnetic field produced by a magnet 22 and is surrounded by a coil 23 to which the impulses to be recorded are applied. The lens 13 images the apertures 19 and 20 on the plate 15 as indicated at 24 and 25. When the impulses to be recorded are applied to the coil 23, the lens 13 is vibrated in accordance with these impulses, the images 24 and 25 are similarly vibrated transversely of the light slit 26 and there is produced on the sound track 27 of the film 18 a well known type of push pull record. It will, of course, be understood that a suitable film drive mechanism is provided for moving the film transversely of the light slit at a substantially constant speed.

The vibratible lens mount of Fig. 2 differs from that of Fig. 1 in that the lens 13 is mounted in a resilient support 28 which is attached to the magnetic structure 22 by means of screws 29 and washers 30 which may be of brass or other suitable non-magnetic material. It will be noted that the end of the armature 21 is attached to the transverse member of the support 28 and imparts to this support and to the lens 13 a motion which is substantially linear. This structure has the advantage that it may be so designed as to provide a desired response characteristic. Thus it may be made to have the natural vibration period most suitable for the conditions under which it is operated. The natural vibration period may, of course, be within or without the signal frequency range depending on the result desired.

The lens mount of Fig. 3 differs from those of the previous figures in that the lens 13 is mounted at one end of a bell crank 31 and the armature is attached to the other end of this bell crank which is pivoted at 32. The operation of this modification of the invention is apparent from the previous explanation.

In the arrangement of Fig. 4, the lens 13 is of the cylindrical type and is provided with pivotal supports 33 and 34 about which it is rotated in response to vibration of the end of the armature 21 with which the lower edge of the lens is articulated. This rotation of the lens moves the images 24 and 25 transversely of the slit 26 in accordance with the impulses applied to the coil 23 as previously explained.

I claim as my invention:

1. A push-pull variable area sound recording system comprising a source of light rays, means for defining said rays into a plurality of beams of predetermined shape, means for forming a light slit, means for projecting images of said beam defining means on said light slit, said images being oppositely disposed on each side of said slit, a light-sensitive surface, means for projecting an image of said slit to said light sensitive surface, and a lens intermediate said beam defining means and said slit forming means, said lens adapted to be vibrated transversely of said slit to shift the light beam across said slit in accordance with sound waves to be recorded, 2. A push-pull variable area sound recording system comprising a source of light rays, means for defining said rays into a pair of light beams of similar shape, means for forming a light slit, means for projecting images of said beam defining means on said slit, said images being oppositely disposed on each side of said slit, a light-sensitive surface, means for projecting an image of said slit to said light-sensitive surface, a lens for passing light from said beam defining means to said slit forming means, said lens being adapted to shift the images of said beam shaping means transversely of said slit, and means for vibrating said lens in accordance with sound waves to be recorded.

3. An electro-magnetic light beam modulator comprising means for generating a substantially constant magnetic field, a lens, means for pivotally mounting said lens, and an armature in said magnetic field connected to said lens and adapted to oscillate said lens on said mounting upon movement of said armature.

4. An electro-magnetic light beam modulator comprising means for generating a substantially constant magnetic field, a cylindrical lens mounted for oscillation about its principal axis, and an armature in said magnetic field connected to said lens for oscillation thereof upon movement of said armature.

5. An electro-magnetic light beam modulator comprising means for generating a substantially constant magnetic field, a resilient bracket member connected to said magnetic field generating means, a lens mounted on said bracket, and an armature positioned in said magnetic field and connected to said bracket for vibrating said lens with a substantially linear motion.

6. A light modulator in accordance with claim 5 in which the natural vibration period of said lens is controlled by the predetermined resiliency of said bracket member.

FRANK E. RUNGE.